(12) United States Patent
Soulas et al.

(10) Patent No.: US 12,146,430 B2
(45) Date of Patent: Nov. 19, 2024

(54) COMPUTER FOR DIAGNOSING CLOGGING OF A PROBE FOR A VEHICLE

(71) Applicant: Vitesco Technologies GmbH, Regensburg (DE)

(72) Inventors: Nicolas Soulas, Toulouse (FR); Antoine Delbos, Toulouse (FR); Nicolas Oberti, Toulouse (FR)

(73) Assignee: Vitesco Technologies GmbH, Regensburg (DE)

( * ) Notice: Subject to any disclaimer, the term of this patent is extended or adjusted under 35 U.S.C. 154(b) by 128 days.

(21) Appl. No.: 18/017,147

(22) PCT Filed: Oct. 8, 2021

(86) PCT No.: PCT/EP2021/077850
§ 371 (c)(1),
(2) Date: Jan. 20, 2023

(87) PCT Pub. No.: WO2022/084067
PCT Pub. Date: Apr. 28, 2022

(65) Prior Publication Data
US 2023/0296042 A1 Sep. 21, 2023

(30) Foreign Application Priority Data
Oct. 23, 2020 (FR) ..................... 2010907

(51) Int. Cl.
*F01N 11/00* (2006.01)
*F01N 9/00* (2006.01)
(Continued)

(52) U.S. Cl.
CPC ............ *F01N 11/007* (2013.01); *F01N 9/005* (2013.01); *F01N 9/007* (2013.01); *F01N 2550/02* (2013.01);
(Continued)

(58) Field of Classification Search
CPC combination set(s) only.
See application file for complete search history.

(56) References Cited

U.S. PATENT DOCUMENTS

| 6,877,498 B1 * | 4/2005 | Matsushima | ....... F02D 41/1474 |
| | | | 123/690 |
| 7,240,479 B1 * | 7/2007 | Fujimoto | ............ F02D 41/1495 |
| | | | 60/285 |

(Continued)

FOREIGN PATENT DOCUMENTS

| DE | 102005059450 A1 | 6/2007 |
| DE | 102013201734 A1 | 8/2014 |
| EP | 1074718 A2 | 2/2001 |

OTHER PUBLICATIONS

International Search Report and Written Opinion for International Application No. PCT/EP2021/077850, mailed Jan. 24, 2022, 10 pages.

(Continued)

*Primary Examiner* — Binh Q Tran
(74) *Attorney, Agent, or Firm* — Buchanan Ingersoll & Rooney PC

(57) ABSTRACT

A computer for a vehicle, the vehicle including a heat engine, a depollution system configured to depollute the exhaust gases originating from the engine, a first probe placed between the outlet of the heat engine and the inlet of the depollution system and configured to measure a first parameter relating to the oxygen level in the exhaust gases exiting the heat engine, a second probe placed at the outlet of the depollution system and configured to measure a second parameter relating to the oxygen level in the exhaust gases exiting the depollution system. The computer being configured to receive the values measured by the first probe and by the second probe over a predefined measurement time interval and to diagnose clogging of the first probe.

12 Claims, 2 Drawing Sheets

(51) Int. Cl.
  *F02D 41/14* (2006.01)
  *F02D 41/22* (2006.01)
  *F02D 41/24* (2006.01)

(52) U.S. Cl.
  CPC ...... *F01N 2550/04* (2013.01); *F01N 2550/20* (2013.01); *F01N 2900/0418* (2013.01); *F01N 2900/0421* (2013.01); *F01N 2900/1402* (2013.01); *F01N 2900/1624* (2013.01); *F02D 41/1454* (2013.01); *F02D 41/222* (2013.01); *F02D 41/2403* (2013.01)

(56) References Cited

U.S. PATENT DOCUMENTS

| | | | |
|---|---|---|---|
| 7,418,853 B2 | 9/2008 | Odendall | |
| 10,019,854 B1* | 7/2018 | McQuillen | F02D 41/1482 |
| 2003/0097873 A1* | 5/2003 | Surnilla | F02D 41/222 |
| | | | 73/114.77 |
| 2006/0243592 A1 | 11/2006 | Odendall | |
| 2006/0265116 A1* | 11/2006 | Ozaki | F02D 41/222 |
| | | | 123/688 |
| 2009/0288391 A1* | 11/2009 | Aoki | F01N 13/0093 |
| | | | 123/704 |
| 2010/0168986 A1* | 7/2010 | Iwazaki | F02D 41/0085 |
| | | | 123/703 |
| 2019/0072020 A1* | 3/2019 | Hagiwara | F01N 11/007 |

OTHER PUBLICATIONS

International Search Report and Written Opinion for International Application No. PCT/EP2021/077850, mailed Jan. 24, 2022, 15 pages (French).

* cited by examiner

COMPUTER FOR DIAGNOSING CLOGGING OF A PROBE FOR A VEHICLE

CROSS REFERENCE TO RELATED APPLICATIONS

This application is the U.S. National Phase Application of PCT International Application No. PCT/EP2021/077850, filed Oct. 8, 2021, which claims priority to French Patent Application No. 2010907, filed Oct. 23, 2020, the contents of such applications being incorporated by reference herein.

FIELD OF THE INVENTION

The invention relates to the field of heat engine vehicles, and more specifically to a computer for diagnosing clogging of a probe configured to measure the amount of oxygen exiting the heat engine of a vehicle.

BACKGROUND OF THE INVENTION

In a known manner, the heat engine of a vehicle is connected to an exhaust line, particularly allowing the exhaust gases emitted during the combustion phase of the heat engine to be discharged via an exhaust pipe. In addition, the exhaust line comprises a depollution system allowing the pollution from the exhaust gases emitted by the heat engine to be reduced before they are discharged.

In addition, a probe is mounted between the outlet of the heat engine and the inlet of the depollution system and is particularly able to measure the oxygen level in the exhaust gases.

Also in a known manner, the vehicle comprises an engine control unit, able to control the various actuators of the heat engine, in particular the injectors, the air intake flaps, etc. The control unit determines, from the oxygen level measured by the probe, the amount of fuel to be injected into the heat engine, so that the proportion between the amount of fuel and the amount of air is optimal during the combustion phase of the heat engine, in order to ensure maximum efficiency for the heat engine.

Furthermore, the probe also allows the engine control unit to be provided with information concerning the level of pollutants included in the exhaust gases.

However, during the combustion of a mixture of air and fuel by the engine, when this mixture includes more fuel than necessary, soot can be deposited on the probe, and therefore the oxygen probe clogs up, in other words, it becomes dirty.

When the probe is clogged, it can take erroneous measurements, in which case the engine control unit could determine an incorrect amount of fuel to be injected.

In addition, when the probe is clogged, it is also possible that it is no longer able to take measurements.

The engine control unit is able to detect a malfunction of the probe and to advise the user of the vehicle to replace the oxygen probe. However, clogging of the probe is by nature temporary. Indeed, the probe can be unclogged in tens of minutes, particularly when the heat engine is operating at high speed, in other words, when the air flow in the heat engine and the temperature are high.

Thus, if the user of the vehicle follows the recommendations provided by the engine control unit and decides to change the probe or have the probe changed, this will incur costs, in particular the cost of a new probe or even the fitting of the new probe, which could have been avoided.

Therefore, a requirement exists for a solution for at least partly addressing these disadvantages.

SUMMARY OF THE INVENTION

An aspect of the invention relates to a computer for a vehicle, said vehicle comprising:
 a heat engine;
 a depollution system fluidly connected to the engine and configured to depollute the exhaust gases originating from said engine;
 a first probe placed between the outlet of the engine and the inlet of the depollution system and configured to measure a first parameter relating to the oxygen level in the exhaust gases exiting the engine;
 a second probe placed at the outlet of the depollution system and configured to measure a second parameter relating to the oxygen level in the exhaust gases exiting the depollution system,
said computer being configured to communicate with the first probe and the second probe, said computer comprising a memory zone, in which a predetermined value of a counter is recorded, said computer being configured to:
 receive the values measured by the first probe and by the second probe over a predefined measurement time interval;
 determine the variation of a first air coefficient from the values received from the first probe and the variation of a second air coefficient from the values received from the second probe over the predefined measurement time interval, with the first air coefficient and the second air coefficient being defined by the ratio between the air mass admitted into the heat engine and the admitted air mass corresponding to the theoretical air mass requirement for the total combustion of a predefined amount of fuel injected into the heat engine;
 compute the integral between the variation of the first coefficient and the variation of the second coefficient over a computation time interval included in the predefined measurement time interval;
 determine that the computed integral is within a predefined reference mean value range or is outside said predefined reference mean value range;
 decrement the counter when the computed integral is within the predefined reference mean value range;
 increment the counter when the computed integral is outside the predefined reference mean value range;
 diagnose clogging of the first probe when the value of the counter is equal to a predefined counter threshold.

Thus, the computer allows clogging of the first probe to be detected quickly. In addition, the computer thus allows a distinction to be made between a definitive malfunction of the first probe, in particular due to ageing of the first probe, and the temporary clogging of the first probe.

Preferably, the computer is configured to trigger an operation for unclogging the first probe when said computer has diagnosed clogging of the first probe.

Thus, the computer allows unclogging to be detected and a solution to be implemented that rectifies clogging of the first probe.

Preferably, the computer is configured to compute the mean between the computed integral value and a predetermined mean value when the computed integral is within the predefined reference mean value range.

Thus, the computer allows the value of the mean to be updated from the value of the computed integral.

More preferably, the computer is configured to record the value of the computed mean in its memory zone.

The last value of the computed mean is thus preserved in order to be reused by the computer, in particular after the next integral computation.

More preferably, the computer is configured to reset the value of the counter when it has diagnosed clogging of the first probe.

Advantageously, the computer is configured to apply a first correction factor to each value received by the computer and measured by the first probe, and to apply a second correction factor to each value received by the computer and measured by the second probe, before determining the variation of the first air coefficient and the variation of the second air coefficient.

The first correction factor and the second correction factor particularly allow any measurement errors to be corrected.

More preferably, the computer is configured to record the applied first correction factor and the applied second correction factor when the computed integral is within the predefined reference mean value range.

The first correction factor and the second correction factor are therefore retained when the first probe is operating correctly, which allows these values to be subsequently reused.

Preferably, the measurement time interval is defined between a first instant, defined by the interruption of fuel injection into the heat engine, and a second instant, defined by the instant when the first probe and the second probe have measured at least one value equal to a predefined maximum value threshold.

More preferably, the computation time interval is defined between a first instant, defined by the interruption of fuel injection into the heat engine, and a third instant, defined by the instant from which the values measured by the at least one second probe are greater than or equal to the values measured by the first probe.

An aspect of the invention also relates to a vehicle, comprising:
- a heat engine;
- a depollution system fluidly connected to the engine and configured to depollute the exhaust gases originating from said engine;
- a first probe placed between the outlet of the engine and the inlet of the depollution system and configured to measure a first parameter relating to the oxygen level in the exhaust gases exiting the engine;
- a second probe placed at the outlet of the depollution system and configured to measure a second parameter relating to the oxygen level in the exhaust gases exiting the depollution system;
- a computer as described above.

An aspect of the invention also relates to a method for diagnosing clogging of a first probe of a vehicle according to an aspect of the invention, comprising the following steps of:
- the first probe measuring a first parameter and the second probe measuring a second parameter over a predefined measurement time interval;
- determining the variation of a first air coefficient from the values received from the first probe and the variation of a second air coefficient from the values received from the second probe over the predefined measurement time interval, with the first air coefficient and the second air coefficient being defined by the ratio between the air mass admitted into the heat engine and the admitted air mass corresponding to the theoretical air mass requirement for the total combustion of a predefined amount of fuel injected into the heat engine;
- computing the integral between the variation of the first coefficient and the variation of the second coefficient over a computation time interval included in the predefined measurement time interval;
- decrementing the counter when the computed integral is within a predefined reference mean value range;
- incrementing the counter when the computed integral is outside the predefined reference mean value range;
- diagnosing clogging of the first probe when the value of the counter is equal to a predefined counter threshold.

An aspect of the invention also relates to a computer program product, characterized in that it comprises a set of program code instructions, which, when they are executed by one or more processor(s), configure the one or more processor(s) to implement a method as described above.

BRIEF DESCRIPTION OF THE DRAWING

Further features and advantages of aspect of the invention will become more clearly apparent upon reading the following description. This description is purely illustrative and should be read in conjunction with the appended drawings, in which.

DETAILED DESCRIPTION OF THE PREFERRED EMBODIMENTS

Vehicle

Figure 1:
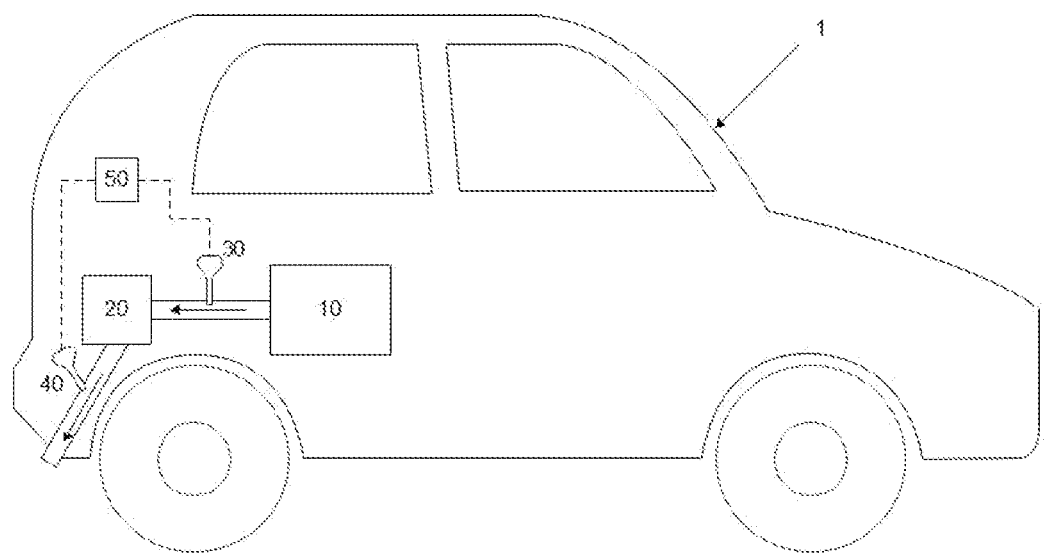
FIG. 1 schematically illustrates an embodiment of the vehicle according to the invention.

With reference to FIG. 1, an embodiment of a vehicle 1 according to an aspect of the invention will now be described.

In a known manner, the vehicle 1 comprises a heat engine 10, a depollution system 20, a first probe 30, at least one second probe 40 and a computer 50.

In a known manner, the heat engine 10 allows the vehicle 1 to move. To this end, the heat engine 10 produces mechanical energy from a mixture of fuel and air, and more specifically from the combustion of the mixture of fuel and air. This combustion also produces exhaust gases, particularly including carbon dioxide, water, dioxygen, nitrogen, carbon monoxide, hydrocarbons and nitrogen oxides.

The depollution system 20 is fluidly connected to the heat engine 10. More specifically, the depollution system 20 is connected to the heat engine 10 via a pipe, in particular a tubular pipe, allowing the exhaust gases emitted by the heat engine 10 to move in the depollution system 20.

The depollution system 20 is configured to depollute the exhaust gases emitted by the heat engine 10, in other words, to convert the polluting gases, in particular the carbon monoxide, the hydrocarbons or the nitrogen oxides included in the exhaust gases, into gas that is harmless to the environment.

To this end, the depollution system 20 can particularly comprise a particulate filter. The particulate filter allows, as its name suggests, the particles emitted in the exhaust gas to be filtered, so that these particles are not emitted in the environment of the vehicle 1.

The depollution system 20 can also comprise other systems, such as an SCR (Selective Catalytic Reduction) module and an oxidation catalyst.

The SCR module, which is known to a person skilled in the art, particularly allows the amount of nitrogen oxide contained in the exhaust gases to be reduced. The oxidation catalyst, for its part, allows the carbon monoxide and the hydrocarbons present in the exhaust gases to be converted into substances that are harmless to the environment of the vehicle 1, by virtue of an oxidation method.

The first probe 30 is placed between the outlet of the heat engine 10 and the inlet of the depollution system 20. More specifically, the first probe 30 is placed on the tubular pipe connecting the heat engine 10 and the depollution system 20.

Even more specifically, the first probe 30 is placed between the outlet of the heat engine 10 and the inlet of the particulate filter of the depollution system 20.

The first probe 30 can be, for example, a probe that is known to a person skilled in the art by the term "oxygen probe" or "lambda probe" or even "upstream probe".

The first probe 30 also can be a probe that is known to a person skilled in the art by the term "NOx probe".

More specifically, the first probe 30 comprises a pumping cell. It is via said pumping cell that the first probe 30 is fluidly connected to the pipe connecting the heat engine 10 and the depollution system 20. In other words, the exhaust gases moving between the heat engine 10 and the depollution system 20 also circulate in the pumping cell of the first probe 30.

The first probe 30 is configured to measure a first parameter relating to the oxygen level in the exhaust gases exiting the heat engine 10 and, in particular, in the exhaust gases circulating from the heat engine 10 to the depollution system 20, via the pipe. The oxygen level in the exhaust gases also allows the oxygen concentration in the exhaust gases to be determined.

The first parameter particularly corresponds to a current, called "pumping current". The pumping current designates the current feeding the pumping cell when exhaust gases circulate in the pumping cell. More specifically, the pumping current is due to the movement of the oxygen, and, more specifically, of the oxygen ions, of the exhaust gases in the pumping cell.

The pumping current particularly represents the difference between the oxygen level in the exhaust gases and a reference oxygen level, emitted in the exhaust gases by the heat engine 10 following the combustion of a mixture of air and fuel, in which the amount of air is the necessary and sufficient amount for allowing complete combustion of the fuel.

The first probe 30 is also configured to send the at least one measured value of the first parameter relating to the oxygen level to the computer 50 over a first communication link. The first communication link is a CAN (Controller Area Network) data bus in particular.

In addition, the first probe 30 is configured to send an identifier to the computer 50, which identifier is associated with each sent measured value, so that the computer 50 determines that the measured values have been sent from said first probe 30.

The second probe 40 is placed at the outlet of the depollution system 20. More specifically, the second probe 40 is placed on a second pipe, in particular a tubular pipe, allowing the exhaust gases depolluted by the depollution system 20 to be discharged toward the outside of the depollution system 20. Even more specifically, the second probe 40 is placed on the second pipe at the outlet of the particulate filter of the depollution system 20.

The second probe 40 can be, for example, a probe known to a person skilled in the art by the term "oxygen probe" or "lambda probe" or even "upstream probe".

The second probe 40 also can be a probe known to a person skilled in the art by the term "NOx probe".

More specifically, the second probe 40 comprises a second pumping cell. It is via said second pumping cell that the second probe 40 is fluidly connected to the second pipe. In other words, the depolluted exhaust gases exiting the depollution system 20 also circulate in the second pumping cell of the second probe 40.

The second probe 40 is configured to measure a second parameter relating to the oxygen level in the exhaust gases exiting the depollution system 20, and, in particular, in the exhaust gases that are discharged from the depollution system 20 via the second pipe.

The second parameter particularly corresponds to a second current called "pumping current". The second pumping current designates the current feeding the second pumping cell when exhaust gases circulate in the second pumping cell. More specifically, the second pumping current is due to the movement of the oxygen, and, more specifically, of the oxygen ions, of the exhaust gases in the pumping cell.

The second pumping current also represents the difference between the oxygen level in the exhaust gases and the reference oxygen level.

The second probe 40 is also configured to send the at least one measured value of the second parameter relating to the oxygen level to the computer 50 over a second communication link. The second communication link is a CAN (Controller Area Network) data bus in particular.

In addition, the second probe 40 is configured to send an identifier to the computer 50, which identifier is associated with each sent measured value, so that the computer 50 determines that the measured values have been sent from said second probe 40.

Figure 2:
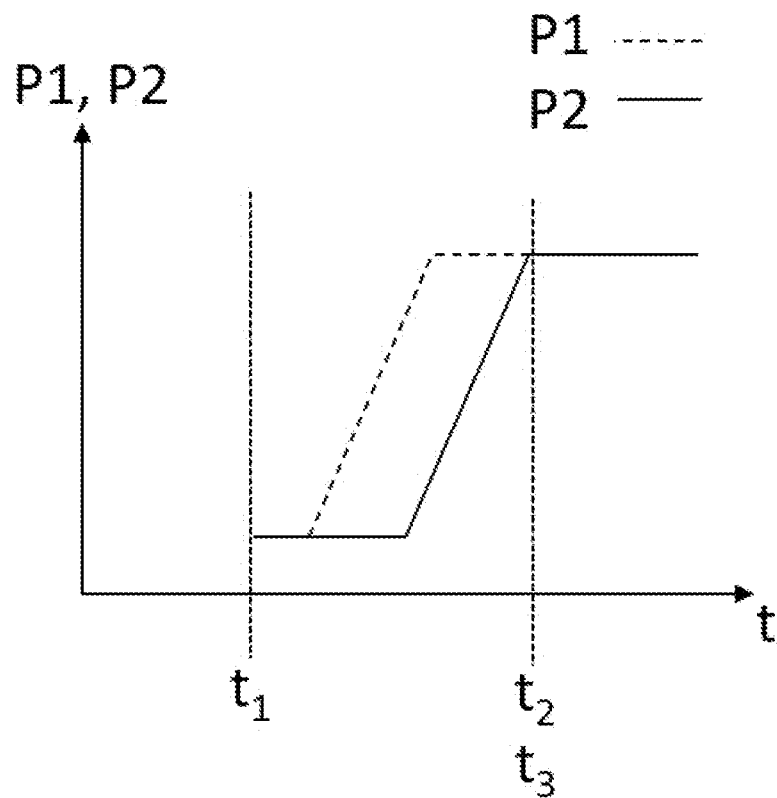
FIG. 2 shows a first example of measured values of the first parameter, measured by the first probe, and of measured values of the second parameter, measured by the second probe, as a function of time, when the first probe operates correctly.
Figure 3:
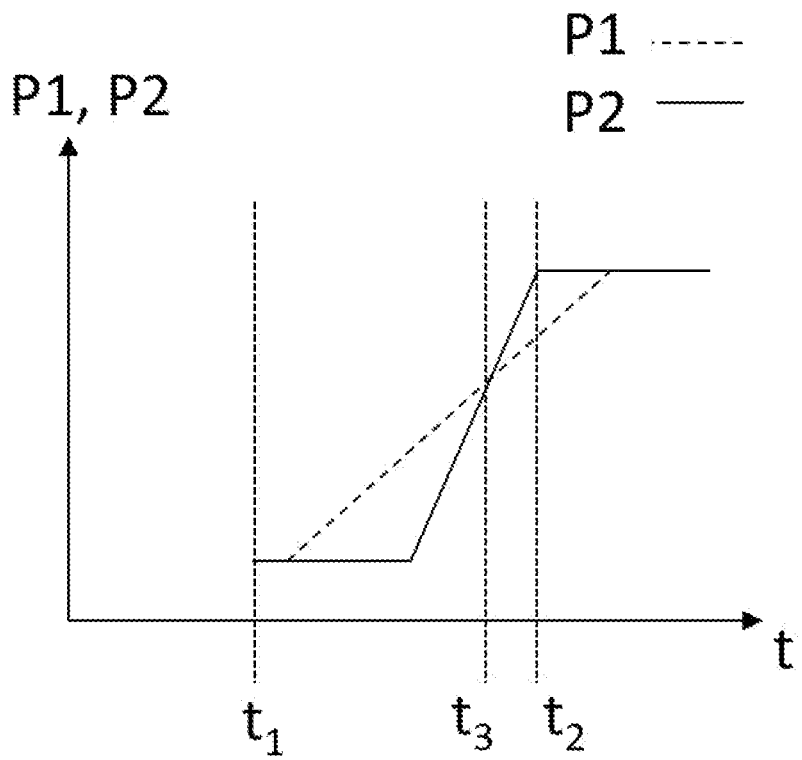
FIG. 3 shows a second example of measured values of the first parameter, measured by the first probe, and of measured values of the second parameter, measured by the second probe, as a function of time, when the first probe is clogged.

With reference to FIG. 2, a first example is shown of the variation of the measured values of the first parameter P1 and of the second parameter P2 as a function of time t, when the first probe 30 operates normally, in other words correctly. With reference to FIG. 3, a second example is shown of the variation of the measured values of the first parameter P1 and of the second parameter P2 as a function of time t, when the first probe 30 has a clogging problem.

The computer 50 is configured to communicate with the first probe 30 via the first communication link and with the second probe 40 via the second communication link.

The computer 50 comprises a memory zone, in which a predetermined value of a counter and a predetermined mean value are recorded.

The computer 50 is configured to receive, in particular continuously, the values measured by the first probe 30, respectively by the second probe 40, and the identifier associated with each value measured via said first communication link, respectively via said second communication link.

More specifically, with reference to FIGS. 2 and 3, the computer 50 is particularly configured to select, from among the received values, the values measured by the first probe 30 and the second probe 40 over a measurement time interval, which is defined between a first instant $t_1$ and a second instant $t_2$.

The first instant $t_1$ is defined by the interruption of fuel injection into the heat engine 10, particularly when the accelerator of the vehicle 1 is not activated by the driver. For example, if the accelerator is the acceleration pedal, interrupting injection means that the driver does not apply any pressure on the acceleration pedal.

The second instant $t_2$ is defined by the instant, after the first instant $t_1$, from which the first probe 30 and the second probe 40 have measured at least one value equal to a predefined maximum value threshold. The maximum value threshold is particularly defined by the manufacturer and is equal to the value of the second parameter P2, or of the first parameter P1, corresponding to an amount of oxygen close to the amount of oxygen included in pure air.

In particular, the computer 50 is configured to determine the first instant $t_1$ and the second instant $t_2$, in order to define the measurement time interval to be considered.

In order to determine the first instant $t_1$, the computer 50 can be connected to the computer of the heat engine 10, with the computer being able to control the various actuators of the heat engine 10, in particular the injectors, the air intake flaps, etc. According to this example, the computer 50 determines the first instant $t_1$ by receiving information sent by the engine computer, indicating that injection has been interrupted.

According to another example, the computer 50 is connected to the accelerator and is configured to detect when the accelerator is not activated.

In order to determine the second instant $t_2$, the computer 50 compares the values measured by the first probe 30 and by the second probe 40 with the predefined maximum value threshold and detects the second instant $t_2$ when the first probe 30 and the second probe 40 have measured at least one value equal to the predefined maximum value threshold.

In addition, from the identifier associated with each value measured by the first probe 30, respectively by the second probe 40, the computer 50 is configured to identify that the measured values have been emitted by the first probe 30, respectively by the second probe 40.

The computer 50 is also configured to apply a first predefined correction factor to each received value measured by the first probe 30 and is configured to apply a second predefined correction factor to each received value measured by the second probe 40. To this end, the computer 50 adds, to each received value measured by the first probe 30, the value of the first correction factor, and the computer 50 adds, to each received value measured by the second probe 40, the value of the second correction factor.

The first correction factor and the second correction factor are particularly predefined by the computer 50 itself, in order to rectify potential measurement errors made by the first probe 30 and/or by the second probe 40, as a function of the environment. For example, the first correction factor, respectively the second correction factor, allows the received values measured by the first probe 30, respectively by the second probe 40, to be re-centered on the nominal value corresponding to said first probe 30, respectively said second probe 40.

The value of the first correction factor and the value of the second correction factor are particularly recorded in the memory zone of the computer 50. The first correction factor and the second correction factor can correspond to the same value.

In addition, a predefined correspondence table is recorded in the memory zone of the computer 50. The correspondence table comprises, for each value of the first parameter P1, in other words of the first pumping current, the value of a first associated air coefficient. In addition, the correspondence table includes, for each value of the second parameter P2, in other words of the second pumping current, the value of a second associated air coefficient.

The first air coefficient and the second air coefficient are defined by the ratio between the air mass admitted into the heat engine 10 and the admitted air mass corresponding to the theoretical air mass requirement for the total combustion of a predefined amount of fuel injected into the heat engine 10.

Furthermore, the computer 50 is also configured to determine the variation of the first air coefficient, over the predefined measurement time interval, from the received values measured by the first probe 30, to which the computer 50 applied the first correction factor, and from the correspondence table. Similarly, the computer 50 is configured to determine the variation of the second air coefficient, over the predefined measurement time interval, from the received values measured by the second probe 40, to which the computer 50 applied the second correction factor, and from the correspondence table.

For example, when the first pumping current is positive, or its value is relatively high, then the value of the first coefficient is greater than 1. This means that the mixture of air and fuel injected into the heat engine 10 before combustion of the mixture includes a higher air mass than the admitted air mass corresponding to the theoretical air mass requirement for the total combustion of the amount of fuel injected into the heat engine 10. The mixture of air and fuel previously injected into the heat engine 10 is then said to be lean.

Conversely, when the first pumping current is negative, or its value is relatively low, then the value of the first coefficient is less than 1. This means that the mixture of air and fuel injected into the combustion engine 10 before combustion of the mixture includes a lower air mass than the admitted air mass corresponding to the theoretical air mass requirement for the total combustion of the amount of fuel injected into the heat engine 10. The mixture of air and fuel previously injected into the heat engine 10 is then said to be rich.

The computer 50 is also configured to compute the integral between the variation of the first coefficient and the variation of the second coefficient over a computation time interval included in the predefined measurement time interval.

With reference to FIG. 2 and to FIG. 3, the computation time interval is defined between the first instant $t_1$ and a third instant $t_3$, defined by the instant from which each value of the second parameter P2 measured by the second probe 40 is greater than or equal to the values of the first parameter P1 measured by the first probe 30.

In the first example shown in FIG. 2, the third instant $t_3$ is coincident with the second instant $t_2$. In the second example shown in FIG. 3, the third instant $t_3$ differs from the second instant $t_2$ and in particular is less than the second instant $t_2$. Thus, the integral computed by the computer 50 from the values of the first parameter P1 and of the second parameter P2 shown in FIG. 3 is lower than the integral computed by the computer 50 from the values of the first parameter P1 and of the second parameter P2 shown in FIG. 2.

The computer 50 is also configured to determine that the computed integral is within a predefined reference mean value range or is outside said predefined reference mean value range.

The reference mean value range is particularly predefined by the computer 50, for example, when the vehicle 1 starts to operate. The reference mean value range can also correspond to a standard.

The reference mean value range can be defined as a function of the predetermined mean value recorded in the memory zone. For example, the maximum value of the reference mean value range corresponds to the recorded mean value, to which the value of a first predefined threshold is added. By way of another example, the minimum value of the reference mean value range corresponds to the recorded mean value, from which the value of a second predefined threshold is subtracted. The first threshold and the second threshold can correspond to the same value.

In particular, the computed integral corresponding to the first example shown in FIG. 2 is included in the predefined reference mean value range. Conversely, the computed integral relating to the second example shown in FIG. 3 is outside the predefined reference mean value range, in particular since the value of the integral computed relative to the second example is small and is less than the minimum value of the reference mean value range.

The computer 50 is also configured to compute the mean between the computed integral value and the predetermined mean value when the computed integral is within the predefined reference mean value range.

In addition, the computer 50 is also configured to record the mean computed in the memory zone, as a replacement for the predetermined mean value.

The computer 50 is also configured to decrement the counter, recorded in the memory zone, when the computed integral is within the predefined reference mean value range. For example, the computer 50 removes 1 from the value of the counter recorded in the memory zone.

In addition, when the computed integral is within the predefined reference mean value range, the computer 50 is also configured to record, in its memory zone, the first correction factor, previously applied to the at least one measured value of the first parameter P1. Similarly, the computer 50 is also configured to record the second correction factor in its memory zone that is previously applied to the at least one measured value of the second parameter P2. The values of the first recorded factor and of the second recorded factor thus can be subsequently reused, when subsequent measurements, taken by the first probe 30 and the second probe 40, will be received by the computer 50.

The computer 50 thus retains the value of the first correction factor and of the second correction factor, when the first probe 30 and the second probe 40 operate correctly.

Furthermore, the computer 50 is also configured to increment the counter, recorded in the memory zone, when the computed integral is outside the predefined reference mean value range. For example, the computer 50 adds 1 to the value of the counter recorded in the memory zone.

In addition, the computer 50 is configured to diagnose clogging of the first probe 30 when the value of the counter is equal to a predefined counter threshold. More specifically, in the present case, the counter has already been incremented.

The counter threshold is particularly defined beforehand, for example, by the manufacturer, and its value is also recorded in the memory zone of the computer 50. The value of the counter threshold is particularly less than 20, preferably less than or equal to 10.

Furthermore, when the computer 50 has diagnosed clogging of the first probe 30, the computer 50 is configured to stop, over a predefined unclogging time interval, recording the values of the first correction factor and of the second correction factor.

In addition, when the computer 50 has diagnosed clogging of the first probe 30, the computer 50 is also configured to reset the value of the counter, in particular to 0, and to trigger an operation for unclogging the first probe 30.

The predefined unclogging time interval particularly corresponds to the time required for the first probe 30 to be unclogged. For example, the predefined unclogging time interval is equal to a value that is between 10 minutes and 2 hours, preferably as short as possible.

During the unclogging operation, the heat engine 10 operates at a high speed, in which the air flow and the temperature in the heat engine 10 are high. Under these conditions, the soot that was previously deposited on the first probe 30, and which clogged the first probe 30, is burnt, by virtue of the high temperature, and is discharged, since the air flow is significant.

In addition, during the unclogging operation, the computer 50 also can be configured to shut-off the EGR (Exhaust Gas Recirculation) valve of the heat engine 10. The EGR valve particularly allows the exhaust gases emitted by the heat engine 10 to be redirected to the injector of the heat engine 10, so that the exhaust gases are burnt a second time. This increases the amount of soot emitted into the exhaust gases by the heat engine 10. When the EGR valve is shut-off, this particularly allows the emission of soot into the exhaust gases to be limited, thus also limiting clogging of the first probe 30.

To this end, the computer 50 is configured to send a control signal to the EGR valve of the heat engine 10, with the control signal comprising operating instructions indicating the shutting-off of said EGR valve.

The control signal can be sent directly to the EGR valve, or via other computers mounted in the vehicle 1.

The computer 50 comprises a processor able to implement a set of instructions allowing the functions described above to be carried out.

The computer 50 thus allows clogging of the first probe 30 to be diagnosed, and, if necessary, allows unclogging of said first probe 30 to be triggered.

Method

Figure 4:
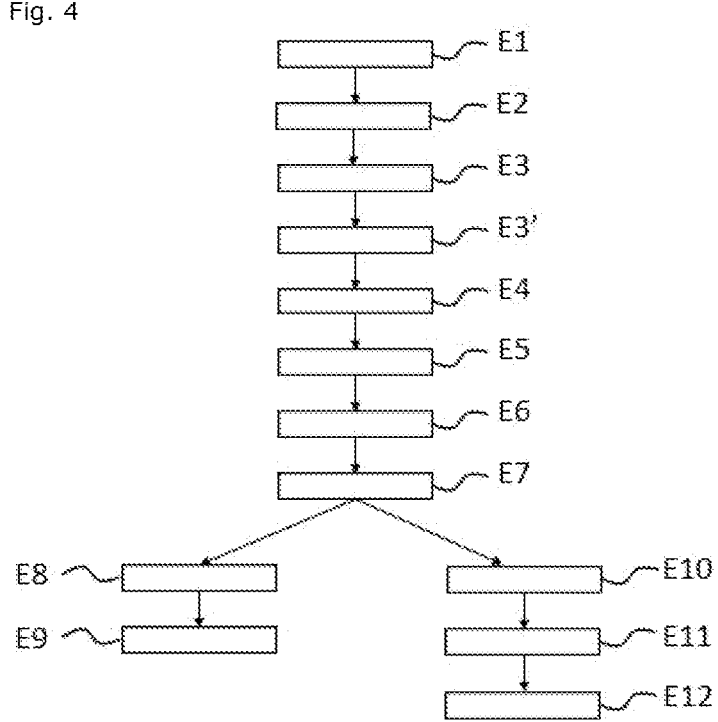
FIG. 4 illustrates an embodiment of the method according to the invention.

With reference to FIG. 4, an embodiment of the method will now be described.

The method comprises a step E1 of measuring a first parameter P1 and a second parameter P2, over a measurement time interval. In the measurement step E1, the first probe 30 measures the values of the first parameter P1 relating to the oxygen level in the exhaust gases exiting the heat engine 10. In addition, the second probe 40 measures the values of the second parameter P2 relating to the oxygen level in the exhaust gases exiting the depollution system 20.

The method comprises a step E2 of sending the values measured by the first probe 30 and by the second probe 40 to the computer 50. In addition, the values measured by the first probe 30, respectively by the second probe 40, are associated with an identifier of the first probe 30, respectively of the second probe 40.

The method also comprises a step E3 of the computer 50 receiving the measured values sent by the first probe 30 and the measured values sent by the second probe 40. In addition, during this step, the computer 50 identifies, from the identifier associated with each measured value of the first parameter P1, respectively of the second parameter P2, that said values have been sent by the first probe 30, respectively by the second probe 40.

Following the receiving step E3, the method comprises a step E3' of selecting received values to be considered. During the selection step E3', the computer 50 determines the first instant $t_1$ and the second instant $t_2$, in order to define the measurement time interval to be considered and thus in order to know which received values are to be selected and considered going forward.

After the selecting step E3', the method comprises a step E4 of the computer 50 applying a first correction factor to each received value, measured by the first probe 30, and applying a second correction factor to each received value, measured by the second probe 40 over the measurement time interval.

The method also comprises a step E5 of the computer 50 determining the variation of a first coefficient and of a second coefficient.

More specifically, during the determination step E5, the computer 50 determines the variation of a first air coefficient, over the defined measurement time interval, from the received values measured by the first probe 30, to which the computer 50 applied the first correction factor, and from the correspondence table. In particular, for each received value of the first parameter P1, the computer 50 selects the value of the corresponding first air coefficient from the correspondence table.

In addition, the computer 50 determines the variation of a second air coefficient, over the defined measurement time interval, from the received values measured by the second probe 40, to which the computer 50 applied the second correction factor, and from the correspondence table. In particular, for each received value, the computer 50 selects the value of the second air coefficient from the correspondence table.

The method then comprises a step E6 of the computer 50 computing the integral between the variation of the first coefficient and the variation of the second coefficient over the computation time interval.

The method then comprises a step E7 of the computer 50 computing the mean between the value of the computed integral and the predetermined mean value, previously recorded in the memory zone of the computer 50, when the value of the computed integral is within the reference mean value range. The new computed mean is then recorded in the memory zone as a replacement for the predetermined mean value.

Furthermore, if the value of the computed integral is within the predefined reference mean value range, the method then comprises a step E8 of the computer 50 decrementing the counter, the value of which is recorded in the memory zone.

In addition, when the computed integral is within the predefined reference mean value range, the method comprises a step E9 of recording the first correction factor, previously applied to each received measured value of the first parameter P1, and the second correction factor, previously applied to each received measured value of the second parameter P2. The decrementing step E8 and the recording step E9 are equally carried out one after the other, or simultaneously.

Conversely, if the computed integral is outside the predefined reference mean value range, the method comprises a step E10 of incrementing the counter for which the value is recorded in the memory zone.

When the value of the counter thus incremented is equal to the predefined counter threshold, the method comprises a step E11 of diagnosing clogging of the first probe 30. In addition, following the diagnosis step E11, the value of the counter is reset to 0 by the computer 50.

Furthermore, following the step E11 of diagnosing clogging of the first probe 30, the method comprises a step E12 of triggering an operation for unclogging the first probe 30, over the predefined unclogging time interval. In particular, in this case, the heat engine 10 operates at a high speed, so that the air flow and the temperature in the heat engine 10 are high in order to burn the soot that clogs the first probe 30 and to remove said soot.

By way of another example, during the unclogging operation, the computer 50 sends a control signal to the EGR valve in order to stop it from operating during the predefined unclogging time interval.

The method according to an aspect of the invention advantageously allows clogging of the first probe 30 to be detected, and, if necessary, an operation for unclogging said first probe 30 to be triggered. With clogging being sudden, the method allows clogging of the first probe 30 to be detected quickly. In addition, and otherwise, namely when the first probe is not clogged and it operates normally, the method allows the values of the first correction factor and of the second correction factor to be recorded that correspond to the normal operation of the first probe 30.

The invention claimed is:

1. A computer for a vehicle, said vehicle comprising:
   a heat engine;
   a depollution system fluidly connected to the engine and configured to depollute the exhaust gases originating from said engine;
   a first probe placed between the outlet of the engine and the inlet of the depollution system and configured to measure a first parameter relating to the oxygen level in the exhaust gases exiting the engine;
   a second probe placed at the outlet of the depollution system and configured to measure a second parameter relating to the oxygen level in the exhaust gases exiting the depollution system,
   said computer being configured to communicate with the first probe and the second probe, said computer comprising a memory zone, in which a predetermined value of a counter is recorded, said computer being configured to:
   a) receive the values measured by the first probe and by the second probe over a predefined measurement time interval;
   b) determine the variation of a first air coefficient from the values received from the first probe and the variation of a second air coefficient from the values received from the second probe over the predefined measurement time interval, with the first air coefficient and the second air coefficient being defined by the ratio between the air mass admitted into the heat engine and the admitted air mass corresponding to the theoretical air mass requirement for the total combustion of a predefined amount of fuel injected into the heat engine;
   c) compute the integral between the variation of the first coefficient and the variation of the second coefficient over a computation time interval included in the predefined measurement time interval;
   d) determine that the computed integral is within a predefined reference mean value range or is outside said predefined reference mean value range;

e) decrement the counter when the computed integral is within the predefined reference mean value range;

f) increment the counter when the computed integral is outside the predefined reference mean value range; and g) diagnose clogging of the first probe when the value of the counter is equal to a predefined counter threshold.

2. The computer as claimed in claim 1, being configured to trigger an operation for unclogging the first probe when said computer has diagnosed clogging of the first probe.

3. The computer as claimed in claim 1, being configured to reset the value of the counter when it has diagnosed clogging of the first probe.

4. The computer as claimed in claim 1, being configured to apply a first correction factor to each value received by the computer and measured by the first probe, and to apply a second correction factor to each value received by the computer and measured by the second probe, before determining the variation of the first air coefficient and the variation of the second air coefficient.

5. The computer as claimed in claim 1, being configured to record the applied first correction factor and the applied second correction factor when the computed integral is within the predefined reference mean value range.

6. The computer as claimed in claim 1, wherein a predefined correspondence table is also recorded in the memory zone of the computer, with the correspondence table comprising, for each value of the first parameter, the value of a first associated air coefficient, and, for each value of the second parameter, the value of a second associated air coefficient.

7. The computer as claimed in claim 1, wherein said first parameter and second parameter correspond to pumping currents designating pumping cell supply currents when exhaust gases circulate in the pumping cell of the first and second probes, respectively.

8. The computer as claimed in claim 1, wherein the measurement time interval is defined between a first instant, defined by the interruption of fuel injection into the heat engine, and a second instant, defined by the instant when the first probe and the second probe have measured at least one value equal to a predefined maximum value threshold.

9. The computer as claimed in claim 1, wherein the computation time interval is defined between a first instant, defined by the interruption of fuel injection into the heat engine, and a third instant, defined by the instant from which the values measured by the at least one second probe are greater than or equal to the values measured by the first probe.

10. A vehicle, comprising:

a heat engine;

a depollution system fluidly connected to the engine and configured to depollute the exhaust gases originating from said engine;

a first probe placed between the outlet of the engine and the inlet of the depollution system and configured to measure a first parameter relating to the oxygen level in the exhaust gases exiting the engine;

a second probe placed at the outlet of the depollution system and configured to measure a second parameter relating to the oxygen level in the exhaust gases exiting the depollution system;

a computer as claimed in claim 1.

11. A method for diagnosing clogging of a first probe of a vehicle as claimed in claim 10, comprising:

a) the first probe measuring a first parameter and the second probe measuring a second parameter over a predefined measurement time interval;

b) determining the variation of a first air coefficient from the values received from the first probe and the variation of a second air coefficient from the values received from the second probe over the predefined measurement time interval, with the first air coefficient and the second air coefficient being defined by the ratio between the air mass admitted into the heat engine and the admitted air mass corresponding to the theoretical air mass requirement for the total combustion of a predefined amount of fuel injected into the heat engine;

c) computing the integral between the variation of the first coefficient and the variation of the second coefficient over a computation time interval included in the predefined measurement time interval;

d) decrementing the counter when the computed integral is within the predefined reference mean value range;

e) incrementing the counter when the computed integral is outside the predefined reference mean value range;

f) diagnosing clogging of the first probe when the value of the counter is equal to a predefined counter threshold.

12. A non-transitory computer program product, comprising a set of program code instructions, which, when they are executed by one or more processor(s), configure the one or more processor(s) to implement a method as claimed in claim 11.

* * * * *